Oct. 11, 1955 — S. S. L. CHANG — 2,720,130
LATHES WITH COMPLEX TOOL MOVEMENT
Filed March 22, 1952
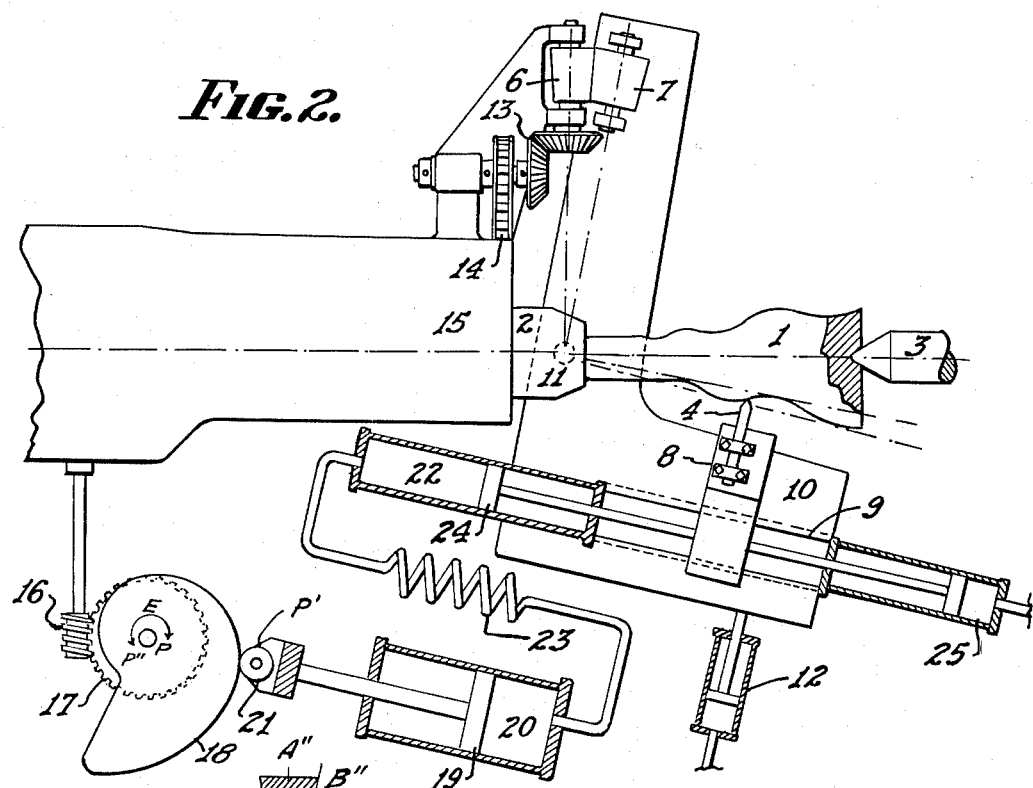
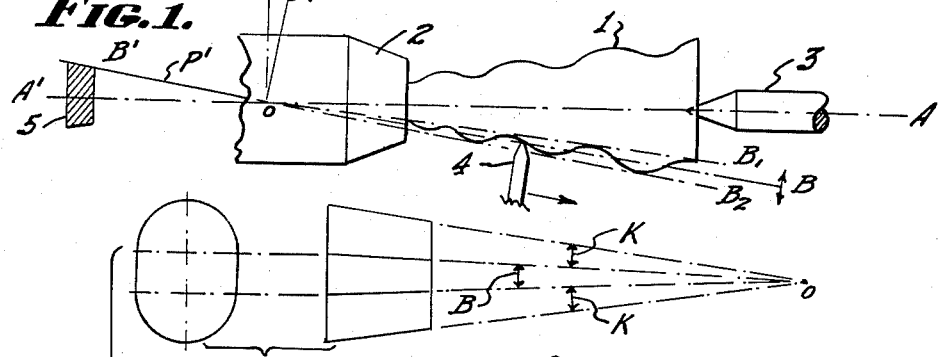
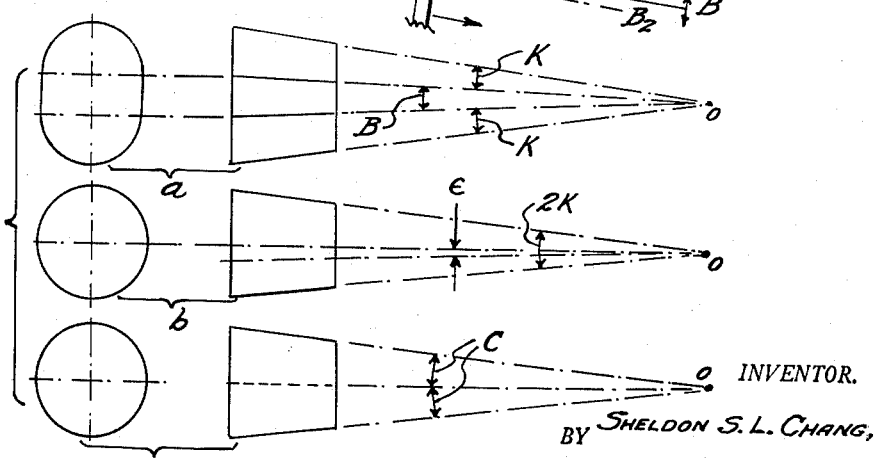
INVENTOR.
BY SHELDON S. L. CHANG,
Allen & Allen
ATTORNEYS.

United States Patent Office 2,720,130
Patented Oct. 11, 1955

2,720,130

LATHES WITH COMPLEX TOOL MOVEMENT

Sheldon S. L. Chang, Springfield, Ohio, assignor to Robbins & Myers, Inc., Springfield, Ohio, a corporation of Ohio Application March 22, 1952, Serial No. 278,030

10 Claims. (Cl. 82—19)

This invention relates to a lathe with a complex tool movement for the turning of objects of peculiar threaded configuration. Among the objects for which the present lathe is particularly designed are cooperating pumping elements for compressors, such as are disclosed and claimed in my copending application, Serial No. 159,078, filed April 29, 1950, Patent No. 2,590,751 patented March 25, 1952, now reissue 23,870 granted Sept. 21, 1954.

In my said copending application I have disclosed and claimed a compressor having cooperating pumping and compressing elements which are similar to the pumping elements disclosed in the Moineau patent, No. 1,892,217, and the Moineau patent, No. 2,085,115. In the last named of the two Moineau patents mentioned above there was disclosed an embodiment wherein the pumping elements were conical in configuration so that pumping pockets of changing capacity were produced, whereby depending upon the direction of flow through the unit it could act either as a compressor or an expander.

A compressor of the conical type as disclosed in detail in my copending application is advantageous from a number of standpoints. However, one of the difficulties in connection with such a compressor is the manufacture of the pumping elements. The generation of the figures which constitute the pumping elements is disclosed in my said copending application and the principal object of my present invention is the provision of a lathe for turning the externally threaded and internally threaded pumping elements for a compressor according to my said copending application.

In the Hagerman patents, Nos. 2,189,867 and 2,189,868, there are disclosed machines for turning the pumping elements of the type of pump disclosed in the Moineau patents above mentioned. In Patent No. 2,566,116, there is disclosed a lathe for turning pumping elements for yet another type of progressive cavity pump, the pump there involved being the one disclosed in Patent Nos. 2,590,435 and 2,590,751.

Of all of the machines heretofore devised for the purpose of turning these complex work pieces, the lathe tool has been fed in a straight line and the peculiar configuration of the work piece has been achieved by a complex rotation and/or nutation of the work piece itself. Such a system is satisfactory for making externally threaded work pieces, but it does not work satisfactorily for internally threaded work pieces. This of course is of no consequence in connection with the pump of the Patents Nos. 2,590,435 and 2,590,751 above mentioned, since the work pieces are disc like and there is not an internally threaded work piece as such, although one of the work pieces may be slightly concave.

It is therefore an object of the present invention to provide a lathe for turning not only the externally threaded work piece, but also the internally threaded work piece, and to accomplish this by an arrangement whereby the work piece rotates axially on centers and whereby the tool is caused to move in a complex path.

It is another object of the invention to provide a machine as above outlined which will be relatively simple in operation, and which will accurately machine a work piece as required for the compressor of the above mentioned copending Chang application.

These and other objects of the invention which will be described in greater detail hereinafter, or which will be apparent to one skilled in the art upon reading these specifications, I accomplish by that certain construction and arrangement of parts of which I shall now disclose an exemplary embodiment.

Reference is made to the drawings forming a part hereof, and in which:

Figure 1 is a diagram showing the relationship of the work piece, tool and cam;

Figure 2 is a fragmentary plan view of a lathe showing an actual embodiment with parts in section according to the present invention; and Figure 3 is a diagram showing details of the cam surfaces.

In Figure 1, I have illustrated the essential motions of a lathe according to the present invention. A work piece is indicated at 1, and it is driven to rotate axially by a spindle 2 and is supported at its other end by a fixed center 3. The tool point is indicated at 4 and it is moved very slowly along the line OB, O being the intersection of the line OB and a spindle axis OA. During the movement of the tool point 4 along the line OB, the line OB is made to oscillate back and forth about the point O at a frequency which is closely related to the revolutions per second of the work piece. The tool point 4 therefore describes a rapid oscillatory motion while moving slowly in the general direction of the line OB.

As was pointed out in the above identified Hagerman patents, if the frequency of oscillation of the line OB is exactly equal to the revolutions per second of the spindle, or is a multiple of the latter, then the forward position of the tool point would always correspond to the same azimuthal position or positions on the work piece, and the finished work would then look like a straight cone generated by a certain figure which increases in size as it travels from O to A.

If, on the other hand, the frequency of the oscillatory motion differs slightly from the revolutions per second of the spindle, or from a multiple of the latter, the generator figure will rotate slowly at a rate equal to the number of revolutions gained or lost, and a threaded work piece will result. The number of revolutions gained or lost during the entire travel of the tool point determines the number of pitches on the work piece. The number of threads is determined by the number of oscillatory motions per revolution. In order to generate the required figure for a stator and a rotor by means of the tool point 4, the oscillatory motion of the tool point must be coordinated to the rotation of the spindle. This can be done by actuating the line OB at Figure 2 by means of a cam geared to the spindle at a ratio very close to unity. In general, the cam may be placed in any desirable position and its contour can then be calculated to produce the desired motion of the tool point. A great saving in calculations could be achieved if the cam could be placed at a point where it would reduce to a simple geometrical figure which could readily be machined on an ordinary lathe.

If a cam 5 were placed with its axis on the extension OA′ of the line OA and a constant pressure T″ were applied to force the line B′OB against the contour of the cam 5 with the cam rotating at about the same speed as the spindle speed, the motion of the tool point 4, and in fact the motion of any point along the line B′B would exactly duplicate the motion of the point B′ at various scales in proportion to its distance from the point O. The generating figure of the work piece would then be an exact duplicate of the cam contour.

In an actual lathe of course, the position at A' is usually occupied by gears. However, the same relationship between cam contour and the generating figure can be obtained by bending the entire cam assembly to a new position A'' and B'' provided that the front line B'' OB is absolutely rigid, and that the angle A'' OA is equal to the angle B'' OB. Practically speaking the equality between the two angles means that when the cam is removed and the line OB' is made to coincide with OA' then the tool point 4 would fall exactly on the axis OA.

Since the generating figures of both members of the cone type compressor are of simple geometrical shape, both cams, that is the cams for stator and rotor, can readily be made on an ordinary lathe. They are sections of a straight cone which will be described in greater detail hereinafter.

In my said copending application I have referred to the angle of eccentricity $\epsilon$ as being equal to one-half of the oscillatory angle which in Figure 1 is the angle $B_1OB_2$. The distance 1 is equal to the distance from O to the tool point 4 in Figure 1. In said copending application I have used A to designate an angle representing the initial direction to which the generating circle is displaced, and I have used D to indicate the rotor diameter. In said application I derived the following equations:

$$D = k_1 l \qquad (1)$$

$$A = k_2 \log_e l \qquad (2)$$

Now for a stator surface the cam is formed so that the sine of the angle $B_1OA$ is equal to $K_1/2$ of Equation 1. For the rotor surface the since of the angle BOA is equal to $K_1/2$ when the line OB is at its middle position. The angle A is equal to the angular shift of the generating figure for the rotor, and twice the angular shift of the generating figure for the stator.

Now let N and N' represent the number of revolutions of the spindle and the cam respectively. Then:

$$A = 2\pi(N'-N) = 2\pi\left(\frac{N'-N}{N}\right)N \qquad (3)$$

for the rotor, and $$A = 4\pi(N'-N) = 4\pi\left(\frac{N'-N}{N}\right)N \qquad (4)$$

for the stator respectively. The ratio $$\left(\frac{N'-N}{N}\right)$$

is a constant of the machine. Let this constant be called Q. Then Equation 2 requires that:

$$C = \exp.\left(\frac{2\pi Q}{K_2}N\right) \quad \text{(for the rotor)} \qquad (5)$$

$$C = \exp.\left(\frac{4\pi Q}{K_2}N\right) \quad \text{(for the stator)} \qquad (6)$$

The exponental relationship between the travel of the tool and spindle revolutions can be achieved with a cam of the logarithmic spiral type.

The foregoing description outlines the essential features and functions of a lathe having a complex tool movement. Such a lathe can be materialized in an actual machine in many ways to perform the essential functions discussed above. I shall now describe one way of achieving this result in detail.

In Figure 2 the essential parts of a suitable lathe are shown. The tool holder 8 is mounted by means of a dovetail 9 on an L-shaped bracket 10, which is free to pivot horizontally about the pivot point 11. It should be noted that the pivot point 11 intersects the axis of the work piece 1 and the spindle 2.

The roller 7 is mounted on the other arm of the L-shaped bracket 10 and is urged against the small cam 6 by the piston of a fluid cylinder 12 which may, if desired, be an air cylinder. The cam 6 is driven through the double gears 13 and a chain drive 14 to the spindle 2 so that it rotates at a fixed ratio to this spindle speed. The ratio as described above is very close to 1. As the cam 6 rotates the bracket 10, as a whole, is caused to oscillate back and forth at a small angular amplitude. The amplitude of the oscillation is shown in broken lines radiating from the pivot point 11 along the edge of the work piece.

The spindle rotation is also connected to the worm 16 through reduction gearing. The worm wheel 17 is fixed to a cam 18 which is arranged to press against a roller 21 secured to a piston 19 operating in the air cylinder 20. The piston 19 forces the fluid in the cylinder 20 through a coil 23 which absorbs the oscillatory motion of the bracket assembly and the piston 24 of the cylinder 22 is gradually forced outward by the fluid inside and pushes the tool holder 8 slowly along the dovetail 9. A constant opposing pressure to keep the cam 18 and roller 21 closely engaged is provided by a suitable air cylinder 25.

Since the L-shaped bracket 10 has considerable inertia, the cam 6 must exert sufficient force on the roller 7 to overcome both the force of inertia and the pressure of the cylinder 12. Therefore, it is very important to provide for substantially line contact between the cam and the roller. This can be achieved by making both the roller and the cam cone-shaped with their apexes lying on the pivot axis 11. Actually the roller and cam are truncated cones, and it is only their imaginary apexes which lie on the pivot axis 11. For the follower 7 the base of the cone is a circle and the follower is concentrically mounted. For the cam 6 for the production of a rotor the base of the cone is a circle but it is eccentrically mounted. The cam for the stator is somewhat egg shaped, as best seen at $a$ in Figure 3.

The stator cam at Figure 3 is made up in effect of three portions: two half cones and a tetrahedron. It may be imagined as a cone having an apex angle $2k$ split in two on an axial plane by a wedge having an apex angle B. The cam axis is the geometrical axis of the figure. The angle B is related to the angle of eccentricity as:

$$B = \frac{4\epsilon}{\cos K} \qquad (7)$$

where $\epsilon$ is the rotor eccentricity. The factor 4 is the same as that found in a pump according to the Moineau patents mentioned above. The factor $\cos K$ results from the fact that while the angle measured along the side is $4\epsilon$, the angle measured along a normal section is $$\frac{4\epsilon}{\cos K}$$

The rotor cam of Figure 3b is a cone having an apex angle $2k$. The cam axis makes an angle $\epsilon$ with the cone axis.

The roller is a cone as shown in Figure 3c having an apex angle 2C, with the cone axis as its axis.

The angles K and C are related to the constant $k_1$ of Equation 1 as:

$$k_1 = 2\sin(K+C) \qquad (8)$$

To determine the contour of the cam 18 which is the exponential spiral cam, let:

R = the length of the line PP' joining the cam axis and the center of the roller 21.

E = the angle between PP' and a fixed line PP'' on the cam.

$F_1F_2$ = ratios of spindle speed to cam speed for the rotor and the stator respectively.

G = the ratio of the area of the cylinder 20 to the area of the cylinder 22.

The angle E is related to the number of revolutions of the spindle:

$$E = \frac{2\pi N}{F_1} \quad \text{and} \quad E = \frac{2\pi N}{F_2} \quad \text{respectively} \quad (9)$$

Comparing the last equation (9) with Equations 3 and 4 we have:

$$A - A_0 = F_1 Q E \quad \text{(for the rotor)} \quad (10)$$

$$A - A_0 = 2 F_2 Q E \quad \text{(for the stator)} \quad (11)$$

wherein $A_0$ is the initial angle. From the last two equations we can see that the same cam can be used for both the rotor and the stator if we make the gear reduction ratio $F_2$ for the stator, one half the ratio $F_0$ for the rotor.

Since the total volume of fluid in the cylinders 20 and 22 remain constant, we have:

$$1 - 1_0 = G(R - R_0) \quad (12)$$

where $1_0$ and $R_0$ are the initial values of 1 and R for $E = 0$.

Equation 2 can be written as:

$$E = \frac{A - A_0}{F_1 Q} = \frac{k_2}{F_1 Q} \log 1 - \frac{k_2}{F_1 Q} \log 1_0 \quad (13)$$

$$E = \frac{k_2}{F_1 Q} \log \frac{1}{1_0}$$

Solving Equations Nos. 12 and 13 we have:

$$R = R_0 + \frac{1_0}{G}[CF_1 Q E/k_2 - 1] \quad (14)$$

This last equation specifies the total radius R of the function of the angle E. In making the cam, we use a grinding wheel of the same diameter as the roller 21, and adjust the distance between the cam axis and the center of the grinding wheel according to Equation 14 while the unfinished cam is being slowly rotated.

It will be clear that many modifications may be made without departing from the spirit of the invention, and I therefore intend to be limited only as set forth in the claims which follow. The details of the compressor and its parts are claimed and disclosed in greater detail in my said copending application.

Having now fully described my invention what I claim as new and desire to secure by Letters Patent, is:

1. In a lathe having means for rotating a work piece axially, a tool holder, and ways along which said tool holder may be fed, means for oscillating said ways about an axis intersecting the axis of rotation of said work piece in relation to the rotation of said work piece, such that the number of oscillations of said ways differs by a small proportional amount from a small integral multiple (including one) of the number of revolutions of said work piece, and means for feeding said tool holder along said ways, such that the tool feed bears a definite functional relationship to the said difference between the number of oscillations of said ways and the said integral multiple of the number of revolutions of said work piece.

2. The structure of claim 1, wherein the oscillation axis is disposed at an angle of 90° to the axis of said ways.

3. The structure of claim 1, wherein the tool feed bears an exponential relationship to the said difference between the number of oscillations of said ways and the said integral multiple of the number of revolutions of said work piece.

4. The structure of claim 1, wherein the oscillation axis is disposed at an angle of 90° to the axis of said ways and wherein the tool feed bears an exponential relationship to the said difference between the number of oscillations of said ways and the said intergral multiple of the number of revolutions of said work piece.

5. In a lathe having means for rotating a work piece axially, a bracket, means mounting said bracket for oscillating movement about an axis intersecting the axis of said work piece and in a plane parallel to the axis of said work piece, ways on said bracket, a tool holder mounted for feeding movement along said ways, a cam follower mounted on said bracket, a cam for actuating said follower, means for rotating said cam at a speed which is proportional to but differs slightly from the rotational speed of said work piece, means urging said bracket to pivot in a direction to cause said cam follower to bear against said cam, and means for feeding said tool holder along said ways at a rate which is a function of the difference between the rotations of said cam and said work piece.

6. A lathe according to claim 5, wherein said cam is circular in cross section and is eccentrically mounted.

7. A lathe according to claim 5, wherein said cam and follower are truncated cones, the theoretical apices of which are on the pivot axis of said bracket, and wherein said cam is eccentrically mounted.

8. A lathe according to claim 5, wherein the means urging said follower against said cam include a fluid cylinder and a piston.

9. A lathe according to claim 5, wherein the means for feeding said tool holder along said ways include means for producing a feeding speed which ears an exponential relationship to the rotational speed of said work piece.

10. A lathe according to claim 5, wherein the means for feeding said tool holder along said ways include a first fluid cylinder and piston arranged to actuate said tool holder, a second fluid cylinder operatively connected to said first fluid cylinder and having a cam actuated piston, said cam having an exponential curve.

References Cited in the file of this patent

UNITED STATES PATENTS

| | | |
|---|---|---|
| 1,289,674 | Coradi | Dec. 31, 1918 |
| 1,350,735 | Phillips | Aug. 24, 1920 |
| 1,502,474 | Kucera | July 22, 1924 |
| 1,865,528 | Lovely | July 5, 1932 |
| 1,950,332 | Von Pechmann | Mar. 6, 1934 |
| 2,168,633 | Smith | Aug. 8, 1939 |
| 2,423,941 | Laisne | July 15, 1947 |
| 2,566,116 | Chang | Aug. 28, 1951 |